United States Patent [19]

Roach et al.

[11] Patent Number: 4,744,152
[45] Date of Patent: May 17, 1988

[54] TOOL FOR MEASURING ANGLES ON VARIOUS ARTICLES

[76] Inventors: Daniel Roach, 1230 St Lawrence Ave., Bronx, N.Y. 10472; George Spector, 233 Broadway RM 3815, New York, N.Y. 10007

[21] Appl. No.: 4,194

[22] Filed: Jan. 16, 1987

[51] Int. Cl.⁴ ............................................. B43L 7/00
[52] U.S. Cl. ...................................... 33/471; 33/427; 33/536
[58] Field of Search .............. 33/452, 456, 457, 458, 33/459, 465, 466, 468, 467, 469, 470, 471, 497, 499, 153 B, 531, 536, 535, 427

[56] References Cited

U.S. PATENT DOCUMENTS

| | | | |
|---|---|---|---|
| 2,448,440 | 8/1948 | King | 33/427 |
| 2,498,867 | 2/1950 | Trefz | 33/536 |
| 2,533,890 | 12/1950 | King | 33/536 |
| 3,942,252 | 3/1976 | Roach et al. | 33/471 |
| 4,641,435 | 2/1987 | Brown | 33/427 |

Primary Examiner—William D. Martin, Jr.

[57] ABSTRACT

A protractor quadrant tool accessory is provided and consists of two arms attached pivotally together at one end, degree calibrations so that the angle between the arms is readily read and a locking device whereby the angle between the arms can be maintained fixed so that the protractor quadrant tool accessory can be used by a machinest and carpenter to measure angles on various articles. In a modification stud guides attached to outer parallel straight edges of the arms can stabilize the tool accessory when measuring the stairways stud angles and the like, used as an isometric center finder and making equal and opposite converse lines upon a stud. In still another modification an adjustable trimitre is slideably locked upon one arm so as to stabilize the tool accessory when measuring the stud angles and the like to be cut.

3 Claims, 2 Drawing Sheets

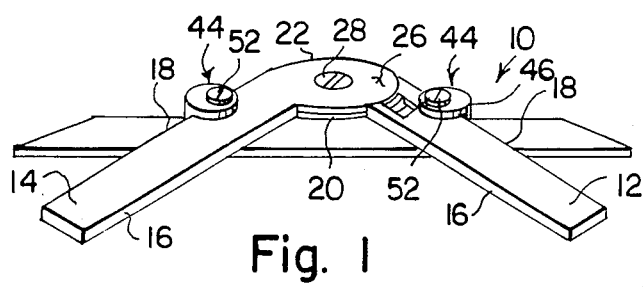
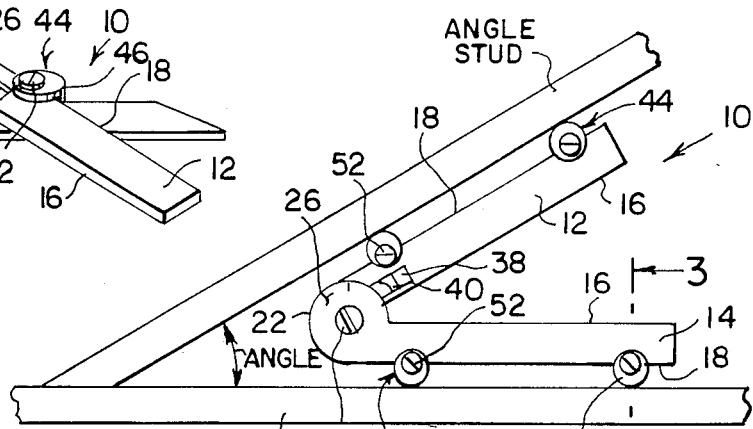
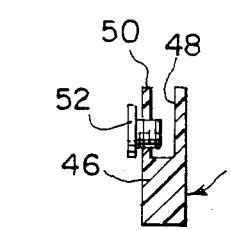
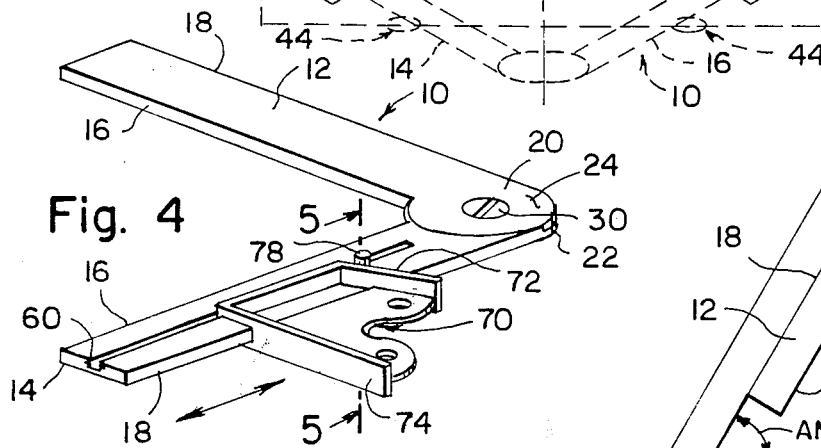
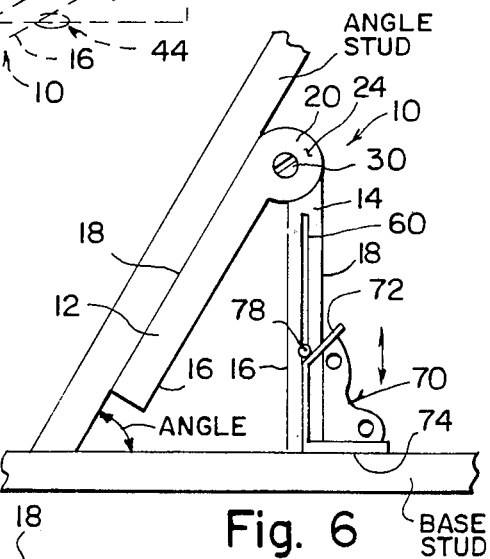
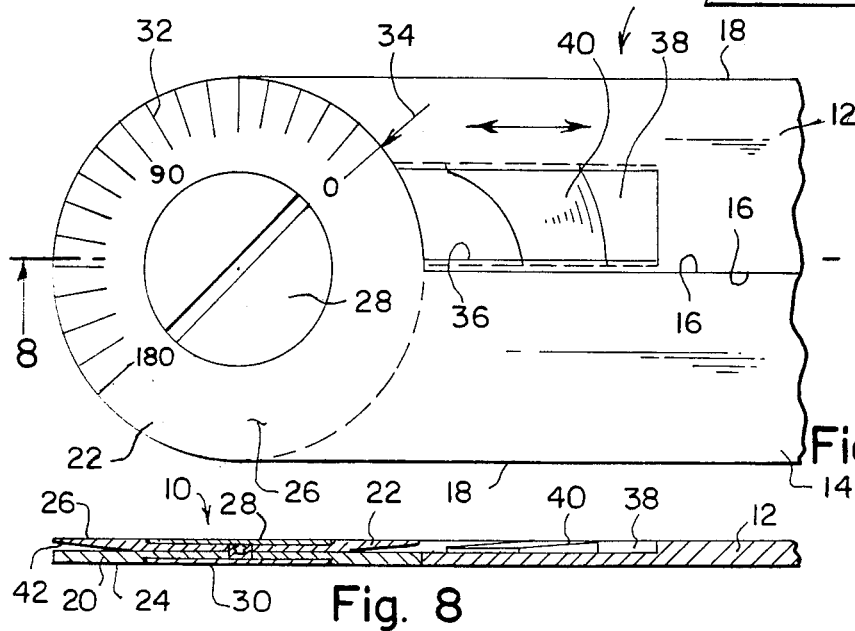
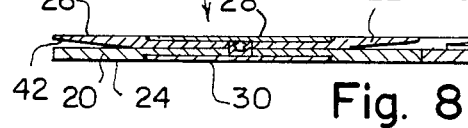

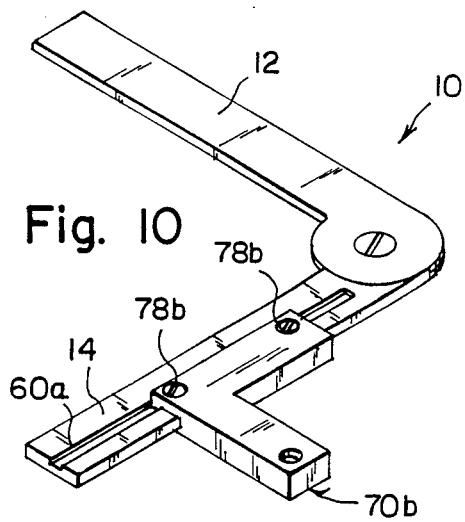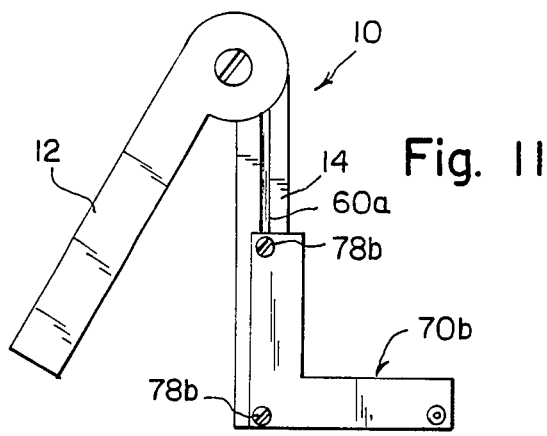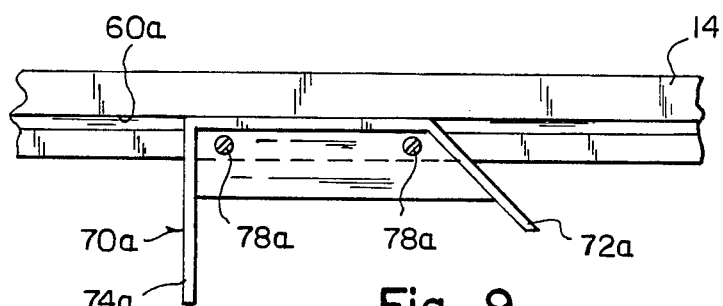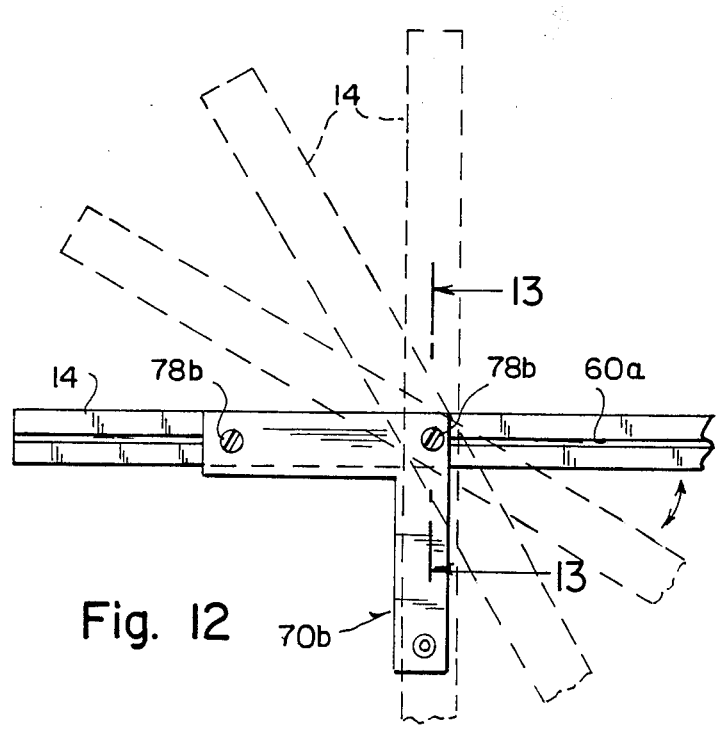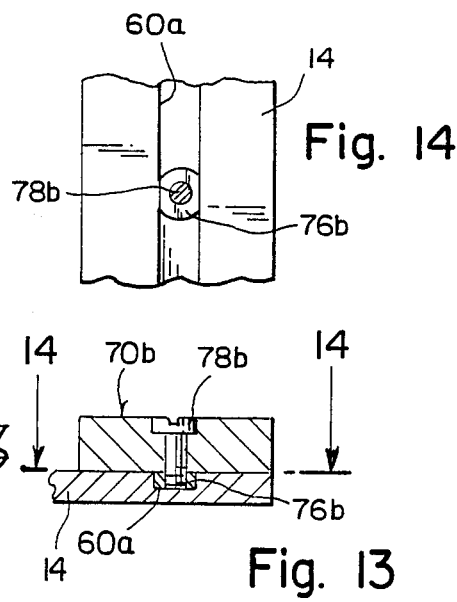

TOOL FOR MEASURING ANGLES ON VARIOUS ARTICLES

BACKGROUND OF THE INVENTION

The instant invention relates generally to protractor devices and more specifically it relates to a protractor quadrant tool accessory.

Numerous protractor devices have been provided in prior art that are adapted to measure angles. For example, U.S. Pat. Nos. 843,459; 932,907; 935,860; 840,439; 1,161,761; 1,161,961; 1,491,048; 1,524,703 and 1,823,931 all are illustrative of such prior art. While these units may be suitable for the particular purpose to which they address, they would not be as suitable for the purposes of the present invention as heretofore described.

SUMMARY OF THE INVENTION

A primary object of the present invention is to provide a protractor quadrant tool accessory that will overcome the shortcomings of the prior art devices.

Another object is to provide a protractor quadrant tool accessory which can be practical for use by either machinests or carpenters for measuring angles on various articles.

An additional object is to provide a protractor quadrant tool accessory in which two straight arms are pivotly attached together at one end with a degree scale around a pivot hub of one of the arms so that the angle between the arms is known and a quick operating lock is incorporated to lock the arms at any fixed angle therebetween.

A further object is to provide a protractor quadrant tool accessory that is simple and easy to use.

A still further object is to provide a protractor quadrant tool accessory that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a perspective view of one design of the invention being used as an isometric center finder.

FIG. 1A is a perspective view in phantom showing the tool making equal and opposite converse lines.

FIG. 2 is a top view of the tool being used to measure the angle of stairway studs with stud guides thereon.

FIG. 3 is a cross sectional view taken along line 3—3 in FIG. 2 of one of the stud guides.

FIG. 4 is a perspective view of a first modification showing a first adjustable trimitre slideably mounted to one arm.

FIG. 5 is an enlarged exploded cross sectional view taken along line 5—5 in FIG. 4 showing a locking adjustment bolt.

FIG. 6 is a top view thereof being used to measure angles of studs.

FIG. 7 is an enlarged top view with parts broken away showing the slide lock and degree calibrations in greater detail.

FIG. 8 is a cross sectional view taken along line 8—8 in FIG. 7.

FIG. 9 is a top view with parts broken away of a second modification showing a second adjustable trimitre slideably mounted to one arm.

FIG. 10 is a perspective view similar to FIG. 4 showing a third adjustable trimitre slideably mounted to one arm of the tool.

FIG. 11 is a top view thereof.

FIG. 12 is a top view of the arm with the third adjustable trimitre thereon.

FIG. 13 is an enlarged cross sectional view taken along line 13—13 in FIG. 12.

FIG. 14 is a cross sectional view taken along line 14—14 in FIG. 13 showing the washer in greater detail.

DETAILED DESCRIPTION OF THE PREFERRED EMBODIMENTS

Turning now descriptively to the drawings, in which similar reference characters denote similar elements throughout the several views, FIG. 1 through 8 illustrates a protractor quadrant tool accessory 10 that consists of first and second similar flat arms 12 and 14. Each of the arms have inner and outer parallel straight edges 16 and 18. The first arm 12 has a circular lower hub 20 at distal end and the second arm 14 has a similar upper hub 22 at distal end. The hubs 20 and 22 are concentric and have spaced parallel outer faces 24 and 26 forming coplanar extensions of the arms 12 and 14.

To interfitting, countersunk head screws 28 and 30 are for axially securing the hubs 20 and 22 together to form a pivotable joint. A plurality of degree calibrations 32 are marked out on the outer face 26 of the upper hub 22 with the 0 degree calibration in alignment with an arrow marker 34 on the first arm 12 when the two arms 12 and 14 are together as shown in FIG. 7.

The first arm 12 has a longitudinal notch 36 contiguous with periphery of the upper hub 22. A wedge 38 is slideably mounted in the notch 36 and has a bevelled upper surface 40. The upper hub 22, as best seen in FIG. 8, has a frustroconical inner surface 42 complementary and opposite to the bevelled surface 40 whereby movement of the wedge 38 radially towards the upper hub 22 causes the bevelled surface 40 to abut the frustroconical surface 42 of the upper hub 22 thereby jamming the hubs 20 and 22 frictionally against the wedge 38. This prevents further relative rotation so that the protractor quadrant tool accessory can be used by a machinist and carpenter for measuring angles on various articles.

The protractor tool accessory 10 further comprises a plurality of stud guides 44. Each stud guide as best seen in FIG. 3 includes a circular housing 46 that has a slot 48 within one side 50 so as to fit upon one of the outer parallel straight edges 18. A securement bolt 52 is threaded into the housing 46 to extend transversely into the slot 48 for securing the housing 46 on one of the outer parallel straight edges 18. This stabilizes the tool accessory 10 when measuring the stairway stud angles as shown in FIG. 2. It can also be used as an isometric center finder in FIG. 1 and for making equal and opposite converse lines 54 and 56 upon a stud 58 shown in phantom in FIG. 1A.

As shown in FIGS. 4, 5 and 6 the second arm 14 can have an elongated longitudinal groove 60 therein with two transverse slots 62 and 64, each in opposite side walls 66 and 68 of the groove. An adjustable trimitre 70 has a 45° guage 72 at one end and a 90° gauge 74 at other end. The trimitre 70 is slideable within the groove 60.

A threaded washer 76 slides within the two transverse slots 62 and 64. A locking adjustment bolt 78 is threaded into the threaded washer 76 to engage with bottom 80 of the groove 60 along any place thereof for locking the adjustable trimitre 70 in position. This stabilizes the tool accessory 10 when measuring stud angles and the like as shown in FIG. 6.

FIG. 9 shows the second arm 14 having an elongated longitudinal groove 60a therein with another type of adjustable trimitre 70a provided with a 45° gauge 72a at one end and a 90° gauge 74a at other end. The trimitre 70a is slideable within the groove 60a. A pair of locking adjustment bolts 78a are spaced apart and threaded into the trimitre 70a to engage with the second arm 14 along any place thereof for locking the adjustable trimitre 70a in position. This stabilizes the tool accessory 10 when measuring stud angles and the like to be cut.

FIGS. 10 to 14 show still another type of adjustable trimitre 70b having an L-shaped 90° configuration. The trimitre 70b is slideable within the groove 60a in the second arm 14. A pair of threaded washers 76b are provided that have flat sides to slide within the groove 60a (see FIG. 14). A pair of adjustment bolts 78b are spaced apart, placed through the trimitre 70b and threaded into the threaded washers 76b. The trimitre 70b can slide along the groove 60a in the second arm 14 to any position when measuring angles on various articles to be cut. The second arm 14 can be replaced with a flat rule (not shown) whereby the flat rule can pivot around corner bolt 78b when other bolt is removed as shown in FIG. 12 to measure various angles therefrom.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A protractor quadrant tool accessory for measuring angles on various articles, which comprises:
   (a) first and second similar flat arms, each of said arms having inner and outer parallel straight edges, said first arm having a circular lower hub at distal end and said second arm having a similar upper hub at distal end, wherein said hubs are concentric and having spaced parallel outer faces forming coplanar extensions of said arms;
   (b) means for securing said hubs pivotally;
   (c) calibrated indicia on said hubs for measuring said angles further comprising pairs of guides, each of which includes:
      (a) a cylindrical housing with top and bottom surfaces having a slot parallel to said surfaces to fit upon said outer parallel straight edges; and
      (b) a securement bolt threaded into said top to extend transversely into said slot for securing said pairs of guides on said outer parallel straight edges so as to contact the article being measured to stabilize said tool accessory when measuring said angle and the like.

2. A protractor quadrant tool accessory as recited in claim 1, further comprising:
   (a) said second arm having an elongated longitudinal groove therein with two transverse slots, each in opposite side walls of said groove;
   (b) an adjustable trimitre having a 45° gauge at one end and a 90° gauge at other end, said trimitre slideable within said groove;
   (c) a threaded washer to slide within said two transverse slots; and
   (d) a locking adjustment bolt threaded into said threaded washer to engage with bottom of said groove along any place thereof for locking said adjustable trimitre in position so as to stabilize said tool against the article being measured.

3. A protractor quadrant tool accessory as recited in claim 1, further comprising:
   (a) said second arm having an elongated longitudinal groove therein;
   (b) an adjustable trimitre having an L-shaped 90° configuration said trimitre slideable within said groove;
   (c) a pair of threaded washers having flat sides to slide within said groove; and
   (d) a pair of adjustment bolts spaced apart, placed through said trimitre and threaded into said threaded washers so that said trimitre can slide along said groove in said second arm to any position when measuring said angles on various articles to be cut.

* * * * *